(12) United States Patent
Matsukiyo et al.

(10) Patent No.: US 6,940,221 B2
(45) Date of Patent: Sep. 6, 2005

(54) DISPLAY DEVICE

(75) Inventors: Hidetsugu Matsukiyo, Chiba (JP); Yasuhide Kashiwakura, Koganei (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 148 days.

(21) Appl. No.: 10/674,101

(22) Filed: Sep. 29, 2003

(65) Prior Publication Data

US 2004/0070329 A1 Apr. 15, 2004

(30) Foreign Application Priority Data

Oct. 10, 2002 (JP) .................................. 2002-297149

(51) Int. Cl.$^7$ ................................................ H01J 1/62
(52) U.S. Cl. .................................... 313/496; 313/486
(58) Field of Search .............................. 313/495, 496, 313/486, 487, 635; 252/301.16, 301.33, 301.4 R, 301.6 R

(56) References Cited

U.S. PATENT DOCUMENTS

| | | | |
|---|---|---|---|
| 4,810,416 A | * | 3/1989 | Hase et al. ............ 252/301.6 R |
| 5,177,401 A | | 1/1993 | Matsukiyo et al. |
| 5,363,013 A | | 11/1994 | Matsukiyo et al. |
| 6,680,004 B2 | * | 1/2004 | Ono et al. ............ 252/301.4 R |

FOREIGN PATENT DOCUMENTS

JP 28-54635 12/1989

OTHER PUBLICATIONS

PJ Born, "A study of phosphors in the yttrium oxide–silicon dioxide phase system", Journal of Materials Science Letters 4, pp. 497–501.

* cited by examiner

*Primary Examiner*—Vip Patel
(74) *Attorney, Agent, or Firm*—Milbank, Tweed, Hadley & McCloy LLP

(57) ABSTRACT

The present invention can further enhance the light emission characteristics of phosphor excited by the irradiation of electron beams of high density. In a cathode ray tube including a phosphor film, a faceplate panel which constitutes a screen, an aluminum vapor-deposited film, a funnel and an electron gun, phosphor which constitutes the phosphor film applied to the faceplate panel is constituted of a terbium activated phosphor which is produced by substituting a portion of yttrium (Y) in base material crystals which contain zinc (Zn), yttrium (Y), silicon (Si) and oxygen (O) as main constitutional elements with terbium ion ($Tb^{3+}$) and a trace amount of rare earth element ion is added to the terbium activated phosphor.

3 Claims, 6 Drawing Sheets

DISPLAY DEVICE

BACKGROUND OF THE INVENTION

1. Field of the Invention

The present invention relates to a display device, and more particularly to a display device which enhances light emission characteristics of phosphor excited by the irradiation of electron beams having high density.

2. Description of the Related Art

With respect to a display device, various types of display devices have been known. Particularly, with respect to a projection type display device or a so-called projector, a cathode ray tube used in such a display device is required to exhibit high luminance and hence, phosphor which constitutes a screen of the display device is required to exhibit the excellent light emission characteristics upon excitation by electron beams at high density. Further, among display devices having a large screen, recently, a field emission display (FED) which constitute one of flat panel type cathode ray tubes has been developed. This FED is also required to include phosphor which exhibits the excellent light emission characteristics upon excitation by electron beams having high density.

The phosphor excited by electron beams of high density is required to satisfy requirements such as (1) the excitation dependency of light emitting efficiency is small, that is, "luminance saturation" is small, (2) lowering of light emitting efficiency due to temperature elevation (so-called temperature quenching) is small, (3) the time-sequential change of light emitting efficiency is small (luminance life time is long) and (4) color tone change of emitted light is small. Further, in the competition with other display devices having a large screen such as a projection type display device using a liquid crystal panel, for example, to further enhance the resolution of displayed images, the suppression of scattering of light in a phosphor film has been studied. In such a study, a method which decreases a film thickness of the phosphor film by using mainly phosphor formed of small particles is adopted and this tendency is steadily increasing recently.

Particularly, many studies have been made with respect to green phosphor which largely contributes to the luminance of images. For example, in "A Study of Phosphors in the yttrium oxide-silicon dioxide phase system" written by P. J. Born, D. S. Robertson, and P. C. Smith (J. Mat. Sci, Lett., 4, pp 497–501 (1985)), a synthesizing method of zinc yttrium silicate activated by terbium ($ZnY_2Si_2O_8:TB^{3+}$) phosphor and some evaluation results on the method are disclosed.

In the above-mentioned non-patented literature, there is disclosed a technique which mixes oxide raw materials of high purity in a wet form and fills the dried materials in a plasma crucible and synthesizes the materials at a high temperature. Further, in this non-patented literature, evaluation results enumerated in following paragraphs (a) to (f) are described.

(a) When TB is used as an activating agent, it is preferable to perform the synthesizing operation in a nitrogen atmosphere and to set the synthesizing temperature to 135° C.

(b) Green-color phosphor ($ZnY_2Si_2O_8:Tb^{3+}$) exhibits higher green light emitting efficiency than $Y_2SiO_5:Tb^{3+}$ or $Y_2Si_2O_7:Tb^{3+}$ (c) With respect to the exciting current dependency of the light emission intensity, $ZnY_2Si_2O_8:Tb^{3+}$ is superior to $Y_3Al_5O_{12}:Tb^{3+}$ and exhibits the favorable elongation in the highly excited intensity region.

(d) The deterioration of luminance is not observed under the exciting condition (high current irradiation) which exhibits the luminance of 2000 ft-L.

(e) By setting the mixing ratio of ZnO to 50 mol % or more, it is possible to obtain the light emitting efficiency substantially equal to the light emitting efficiency of $ZnY_2Si_2O_8:Tb^{3+}$.

(f) Even when the Zn site of $ZnY_2Si_2O_8:Tb^{3+}$ is substituted by Ca or even when the Y site of $ZnY_2Si_2O_8:Tb^{3+}$ is substituted by Gd, no noticeable improvement of the light emitting efficiency is observed.

Further, in Japanese Patent 2,854,635 (concerned with U.S. Pat. Nos. 5,117,401 and 5,363,013), there is a description relating to the luminance lifetime improvement effect obtained by rare earth ions (Eu, Yb, Sm and Tm) of $Y_3(Al_{1-x}Ga_x)_5O_{12}:Tb^{3+}$ (here, $0 \leq x \leq 1$), $(Y_{1-y}Gd_y)_2SiO_5:Tb^{3+}$ (here, $0 \leq x \leq 0.45$), and $InBO_3:Tb^{3+}$ which constitute $Tb^{3+}$ activated oxide phosphors.

Among phosphors which constitute the screen of the display device, particularly green-color phosphor (green phosphor) makes the largest contribution to the luminance (brightness) of the screen. In the above-mentioned non-patented literature, although the evaluation of a case in which $ZnY_2Si_2O_8$ is used as a base material and $Tb^{3+}$ green phosphor is used as an activating agent is disclosed, the luminance effect orientation is still insufficient. Further, in the above-mentioned patent literature, although the luminance improvement effect due to rare earth ion is described, this luminance improvement effect is also insufficient.

Accordingly, the present invention obtain a display device which can solve the above-mentioned drawbacks of the related art and can further enhance the light emission characteristics of phosphor excited by the irradiation of electron beams of high density.

SUMMARY OF THE INVENTION

According to the present invention, in a display device which includes an electron source, a phosphor layer (a phosphor film) which emits light when excited by electron beams irradiated from an electron source, and a panel which forms the phosphor layer thereon, phosphor which forms the phosphor layer is constituted of a terbium activated phosphor which is produced by substituting a portion of yttrium (Y) in base material crystals which contain zinc (Zn), yttrium (Y), silicon (Si) and oxygen (O) as main constitutional elements with terbium ion ($Tb^{3+}$) and a trace amount of rare earth element ion is added to the terbium activated phosphor.

As the rare earth element ion to be added, ytterbium ion ($Yb^{3+}$) or samarium ion ($Sm^{3+}$) is used and the addition concentration is set to a value which falls in a range of 10 µg or more to 500 µg or less and is preferably set to a value in a range of 30 µg or more to 300 µg or less per 1 g of a phosphor base material.

With the use of the above-mentioned phosphor, in the transmission process of the exciting energy, due to the interposition of $Yb^{3+}$ ion or $Sm^{3+}$ ion which is added in a trace quantity, the energy transmission efficiency to the light emitting center is increased and hence, the luminance of the screen is enhanced. When the luminance is measured using a display device which is fabricated on a trial basis, it is confirmed that the luminance is enhanced by approximately 4%. As a result, it is possible to operate the display device with a lower current and hence, the lifetime of luminance is enhanced and electron beams can be made finer whereby it is possible to provide a display device which can enhance the resolution.

The present invention is preferably applicable to various types of display devices and is particularly preferably applicable to a projection type cathode ray tube. Further, when the present invention is applied to a field emission type display device, in addition to the above-mentioned respective advantageous effects, it is possible to reduce damages on a phosphor screen (a phosphor film). Further, with respect to a heat cathode fluorescent lamp, a cold cathode fluorescent lamp and the like, the damages on the fluorescent film derived from the high-load excitation can be reduced and the extinction of light due to temperature can be enhanced.

DESCRIPTION OF THE PREFERRED EMBODIMENTS

Figure 1:
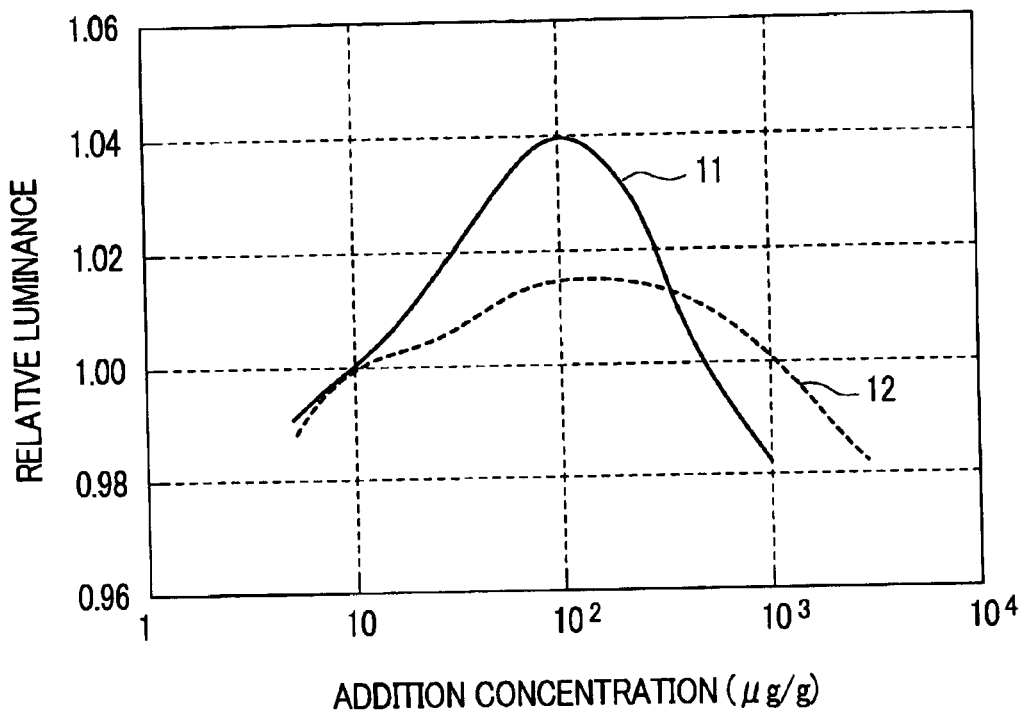
FIG. 1 is an explanatory view showing the addition concentration dependency of the relative luminance on the rare earth ion.

Preferred embodiments of the present invention are explained in detail in conjunction with drawings which show the embodiments.

[First Embodiment]

As raw materials, 9.767 g of zinc oxide (ZnO), 21.000 g of yttrium oxide ($Y_2O_3$), 2.617 g of terbium oxide ($Tb_4O_7$) and 12.137 g of silicon oxide ($SiO_2$) are prepared. These raw materials are sufficiently mixed. Then, to the mixture, an aqueous solution containing ytterbium ion ($Yb^{3+}$) as rare earth ion is added at a plurality of given quantities described later using a measuring pipet in a state that a small quantity of ethanol is added to the mixture. The concentration of the aqueous solution containing ytterbium ion ($Yb^{3+}$) is adjusted such that a quantity of ytterbium ion ($Yb^{3+}$) becomes 10 mg/ml.

The mixture is dried in the air at a temperature of approximately 120° C. for one hour and, thereafter, is put into an alumina crucible and is subjected to heat treatment in the air at a temperature of 1400° C. for two hours. Here, an alumina-made lid is placed (without using an adhesive agent for ceramic) on the alumina crucible. The obtained product is transferred to an agate mortar and is lightly crushed while adding purified water and, at the same time, is made to pass through a sieve. Thereafter, the product is dried in the air at a temperature of 120° C.

A plurality of phosphors which differ in an addition quantity of rare earth ion: ytterbium ion ($Yb^{3+}$) are obtained in this manner are respectively applied onto a substrate made of nickel-plated oxygen-free copper by sedimentation and a plurality of test pieces for measuring light emitting intensity by the irradiation of electron beams are prepared. In applying the phosphors on the substrate, water glass ($K_2O \cdot nSiO_2$, n being approximately 2.8) is used as a binder and barium acetate ($Ba(CH_3COO)_2$) is used as an electrolyte. Here, an addition quantity of phosphor is adjusted such that a film weight assumes approximately 3.5 mg/cm$^2$.

By irradiating the electron beams to the plurality of test pieces, their light emission characteristics are evaluated. In performing this light emission characteristics evaluation, electron beams are irradiated to the fluorescent film under conditions that an acceleration voltage is 30 kV, an irradiation current is 0.12 mA, an irradiation area is 40 mm×30 mm, and the light emitting intensity is measured using a color color-difference meter "CS-100" produced by MINOLTA Co., Ltd. The relative values when the light emitting intensity output of phosphor to which no rare earth ion ($Yb^{3+}$) is added is set to 1 are shown in Table 1.

TABLE 1

| Yb content ($\mu$g/g) | 0 (no addition) | 5 (comparison example 1) | 10 | 50 | 100 | 300 | 500 | 1000 (comparison example 2) |
|---|---|---|---|---|---|---|---|---|
| Relative luminance | 1 | 0.990 | 1.000 | 1.028 | 1.04 | 1.020 | 1.000 | 0.983 |

A temperature of test pieces (test piece temperature) is set to approximately 100° C. Further, a Yb content ($\mu$g/g) which is the addition concentration of ytterbium ion ($Yb^{3+}$) is expressed as a weight of the ion in 1 g of phosphor base material ($ZnY_2SiO_8$).

FIG. 1 is an explanatory view showing the addition concentration dependency of the relative luminance on ytterbium ion ($Yb^{3+}$). In the drawing, the addition concentration ($\mu$g/g) of ytterbium ion ($Yb^{3+}$) is expressed on an axis of abscissas and the relative luminance is expressed on an axis of ordinates. Here, reference symbol 11 indicates a characteristic curve showing the addition concentration dependency of the ytterbium ion ($Yb^{3+}$). On the other hand, reference symbol 12 indicates a characteristic curve showing the addition concentration dependency of the second embodiment of the present invention described later in which samarium ion ($Sm^{3+}$) is used as the rare earth ion.

From a result of the measurement, it is understood that the light emitting intensity is increased by adding ytterbium ion ($Yb^{3+}$) in a range from $10\times10^{-6}$ g/g to $500\times10^{-6}$ g/g. Further, the result of the measurement shows that the light emitting intensity increasing effect is large by adding ytterbium ion ($Yb^{3+}$) in a range from $30\times10^{-6}$ g/g to $300\times10^{-6}$ g/g.

[Second Embodiment]

Next, the second embodiment of the present invention is explained. Using the same synthesizing method and conditions as the first embodiment, phosphors which are formed by adding samarium ion ($Sm^{3+}$) as rare earth ion to the phosphor base material ($ZnY_2SiO_8$) are applied to a substrate and a plurality of test pieces are prepared. Then, the light emitting intensity is measured using the same evaluation method as that of the first embodiment. The relative values when the light emitting intensity output of the phosphor to which no rare earth ion ($Sm^{3+}$) is added is 1 are shown in Table 2.

TABLE 2

| Sm content ($\mu$g/g) | 0 (no addition) | 5 (comparison example) | 10 | 50 | 100 | 500 | 1000 | 3000 (comparison example 4) |
|---|---|---|---|---|---|---|---|---|
| Relative luminance | 1 | 0.998 | 1.000 | 1.010 | 1.035 | 1.012 | 1.000 | 0.981 |

Figure 2:
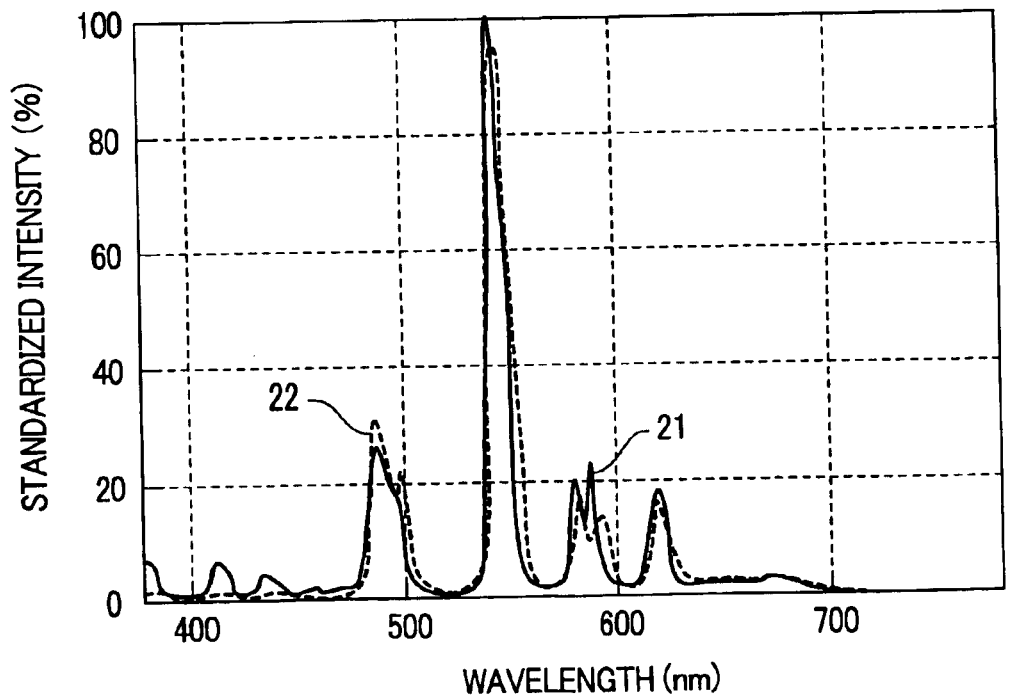
FIG. 2 is an explanatory view which compares a light emitting spectrum of green phosphor of the first embodiment according to the present invention and a light emitting spectrum of conventionally available green phosphor.

FIG. 2 is view which compares light emitting spectrums of the green phosphor of the first embodiment according to the present invention and green phosphor of a conventionally available phosphor. In the drawing, a wavelength (nm) is expressed on an axis of abscissas and a standardized intensity is expressed on an axis of ordinates. The intensity of $ZnY_2SiO_8:Tb^{3+}$ added with $Yb^{3+}$ which constitutes the green phosphor of this embodiment is indicated by reference symbol 21, while the intensity of $Y_2SiO_5:Tb^{3+}$ which constitutes the conventional green phosphor is indicated by reference symbol 22. As shown in FIG. 2, $ZnY_2SiO_8:Tb^{3+}$ added with $Yb^{3+}$ which constitutes the green phosphor of this embodiment exhibits a sharp single peak in the vicinity of 550 nm which is the center wavelength of green.

Figure 3:
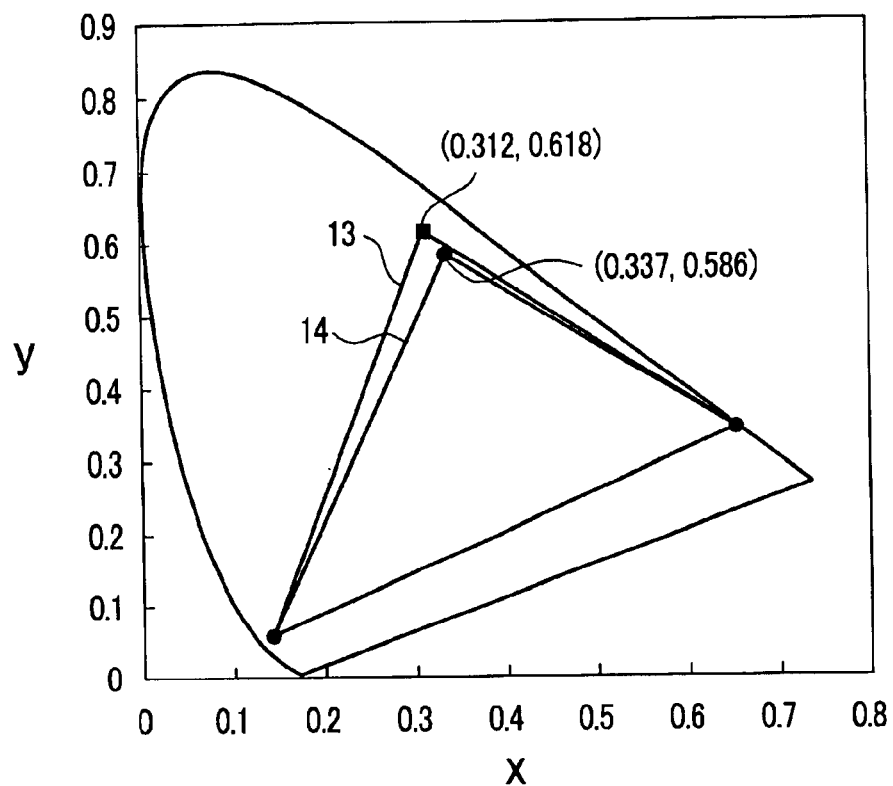
FIG. 3 is an explanatory view of a color reproduction range of a projection type cathode ray tube which uses green phosphor of the first embodiment according to the present invention and the conventionally available green phosphor as indicated by CIE chromaticity coordinates.

Further, FIG. 3 is an explanatory view of a color reproduction range of a projection type cathode ray tube which uses the green phosphor of the first embodiment according to the present invention and the conventionally available green phosphor indicated by CIE chromaticity coordinates. The blue phosphor and the red phosphor are conventionally available ZnS:Ag, Al (blue) and $Y_2O_3$:Eu (red) respectively. The color reproduction range of $ZnY_2SiO_8:Tb^{3+}$ added with $Yb^{3+}$ which constitutes the green phosphor of this embodiment is defined by x=0.312, y=0.618 in the coordinates shown in FIG. 3. On the other hand, the color reproduction range of $Y_2SiO_5:Tb^{3+}$ which constitutes the conventional green phosphor is defined by x=0.337, y=0.586 in the coordinates shown in FIG. 3.

Here, the coordinates shown in FIG. 3 of ZnS:Ag, Al (blue) and $Y_2O_3$:Eu (red) are respectively x=0.144, y=0.057 and x=0.655, y=0.344.

By constituting the display device using these phosphors, as indicated by triangles shown in FIG. 3, it is possible to obtain a cathode ray tube in which, with respect to an area ratio, an area of the color reproduction range 13 using $ZnY_2SiO_8:Tb^{3+}$ added with $Yb^{3+}$ which constitutes the green phosphor of this embodiment is expanded by approximately 11% compared to an area of the color reproduction range 14 using the $Y_2SiO_5:Tb^{3+}$ which constitutes the conventional green phosphor and, at the same time, the light emission characteristics of the phosphors excited by the irradiation of electron beams of high density can be further enhanced.

Further, the addition concentration dependency of the second embodiment of the present invention using samarium ion ($Sm^{3+}$) as the rare earth ion is indicated in FIG. 1 by reference symbol 12. A temperature of test pieces (test piece temperature) is set to approximately 100° C. Further, an $Sm^{3+}$ content ($\mu$g/g) which is the addition concentration of samarium ion ($Sm^{3+}$) is expressed as a weight of the ion in 1 g of phosphor base material ($ZnY_2SiO_8$).

From a result of this measurement, it is understood that the light emitting intensity is increased by adding samarium ion ($Sm^{3+}$) in a range of $10\times10^{-6}$ g/g to $100\times10^{-6}$ g/g.

By constituting the display device using this phosphor, it is possible to obtain a cathode ray tube which can enlarge the color reproduction range in the same manner as the first embodiment and can further enhance the light emission characteristics of phosphors excited by the irradiation of electron beams of high density.

Figure 4A:
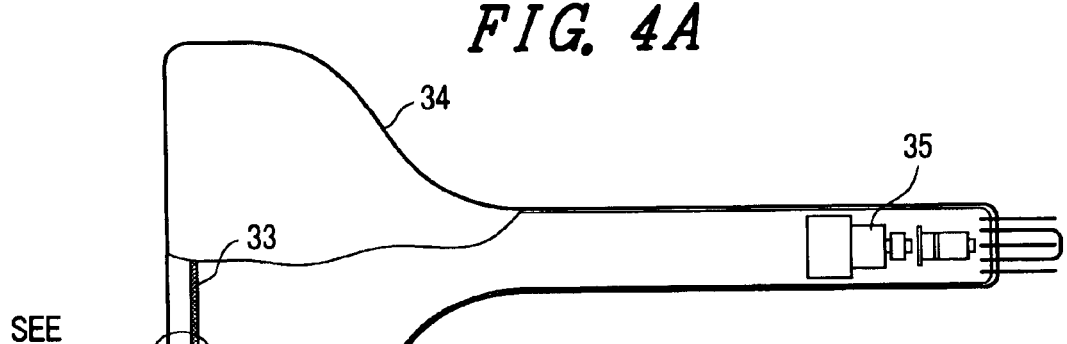
FIG. 4 is an explanatory view of a constitutional example of a projection type cathode ray tube for explaining one embodiment of the display device according to the present invention.
Figure 4B:
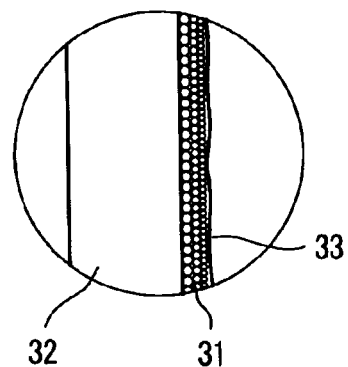

FIG. 4 is an explanatory view of a constitutional example of a projection type cathode ray tube for explaining one specific example of the display device according to the present invention. In the drawing, reference symbol 31 indicates a phosphor film, reference symbol 32 indicates a faceplate panel which constitutes a screen, reference symbol 33 indicates an aluminum vapor-deposited film, reference symbol 34 indicates a funnel, and reference symbol 35 indicates an electron gun. To an inner surface of the faceplate panel 32, the phosphor film 31 which is formed by applying the green phosphor explained in the above explained embodiment of the present invention is applied. An aluminum vapor-deposited film 33 is formed on the phosphor film 31 as a metal back.

The phosphor film 31 constituted of the green phosphor is formed in a following manner. Water glass ($K_2O.nSiO_2$, n being approximately 2.8) is used as a binder and barium acetate ($Ba(CH_3COO)_2$) is used as an electrolyte in applying the green phosphor. Here, an addition quantity of phosphor is adjusted such that a film weight assumes approximately 3.5 mg/cm². The phosphor is applied to the inner surface of the faceplate panel 32 by a flocculation process. Here, a film weight is approximately 3 mg/cm² and a thickness of the phosphor film 31 per se is set to approximately 17 $\mu$m. Further, after applying a film made of organic material, aluminum is vapor-deposited to the film. By removing the film by baking in the heat treatment of approximately 450° C., a metal back made of aluminum vapor-deposited film 33 is formed.

Figure 5:
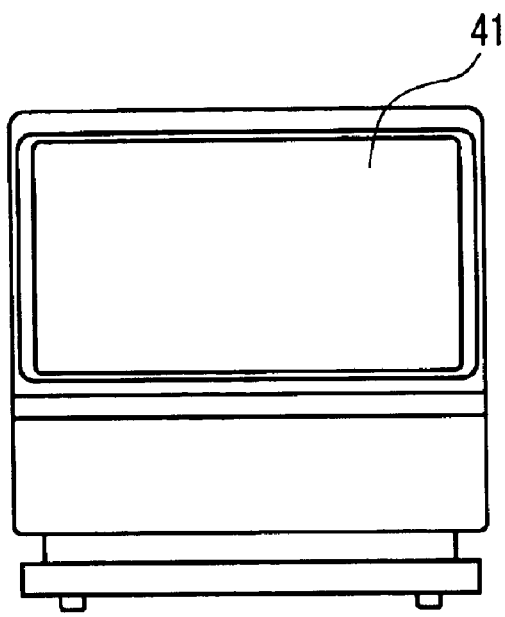
FIG. 5 is a front view for explaining one example of an image display device using cathode ray tubes according to the present invention.
Figure 6:
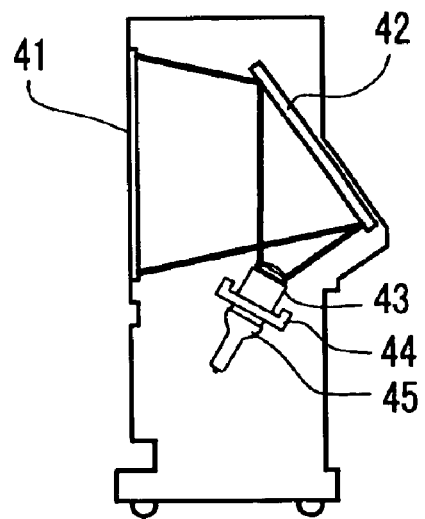
FIG. 6 is an explanatory view of an example of an arrangement of inside of the image display device shown in FIG. 5.
Figure 7:
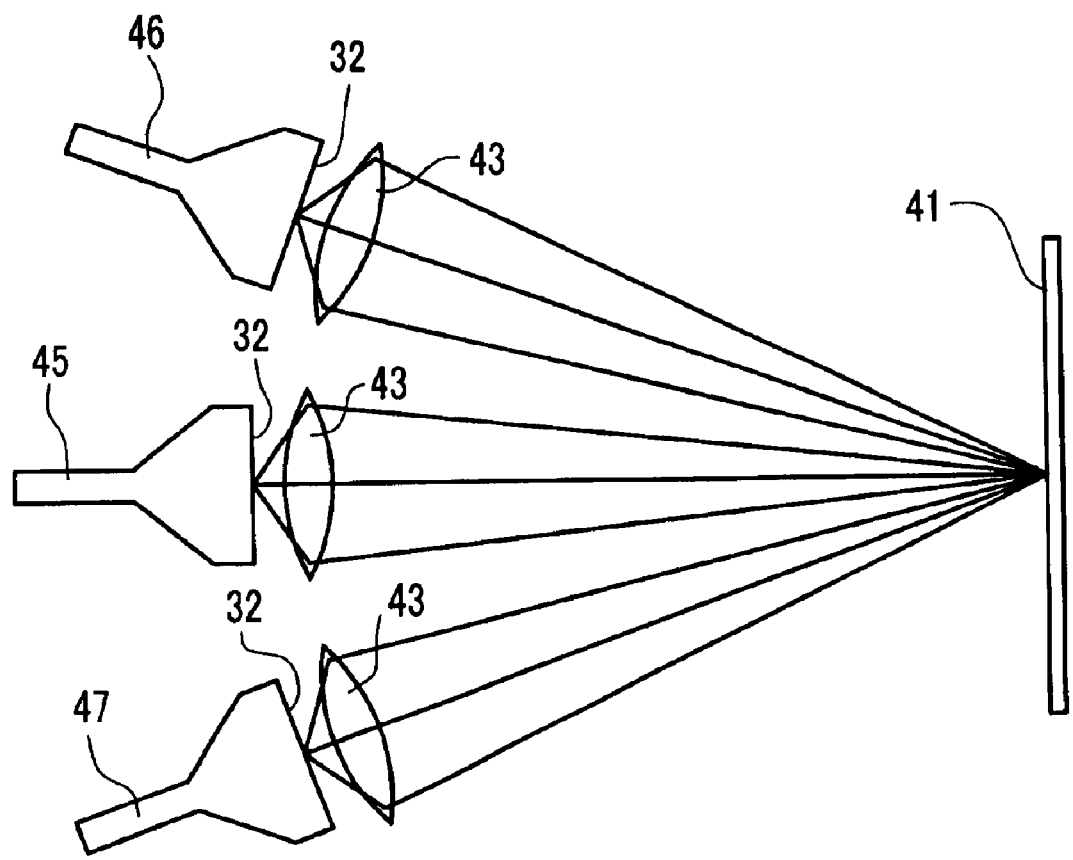
FIG. 7 is a schematic view for explaining the example of arrangement of an optical system of the image display device shown in FIG. 5 and FIG. 6.

FIG. 5 is a plan view for explaining one example of an image display device using the cathode ray tube according to the present invention. FIG. 6 is an explanatory view of an example of inner arrangement of the image display device shown in FIG. 5. FIG. 5 and FIG. 6 show the so-called projection type television receiver set. Further, FIG. 7 is a schematic view for explaining the arrangement example of an optical system. In the inside of the projection type television receiver set, the projection type cathode ray tube 45 for green explained in conjunction with FIG. 4 and other two projection type cathode ray tubes 46 (for red) and 47 (for blue) are installed. Each projection type cathode ray tube includes a projection lens 43. Images formed in the faceplate panels 32 of respective projection type cathode ray tubes 45, 46, 47 are enlarged by respective projection lenses 43 and are synthesized on a screen 41 by a reflection mirror 42. In FIG. 6, reference symbol 44 indicates couplings for mounting the projection lenses 43 to the projection type cathode ray tubes PRT. Here, the image display device shown in FIG. 5 and FIG. 6 merely constitutes one example and there exists an image display device which constitutes a portion including the projection type cathode ray tubes PRT as a separate device.

Figure 8:
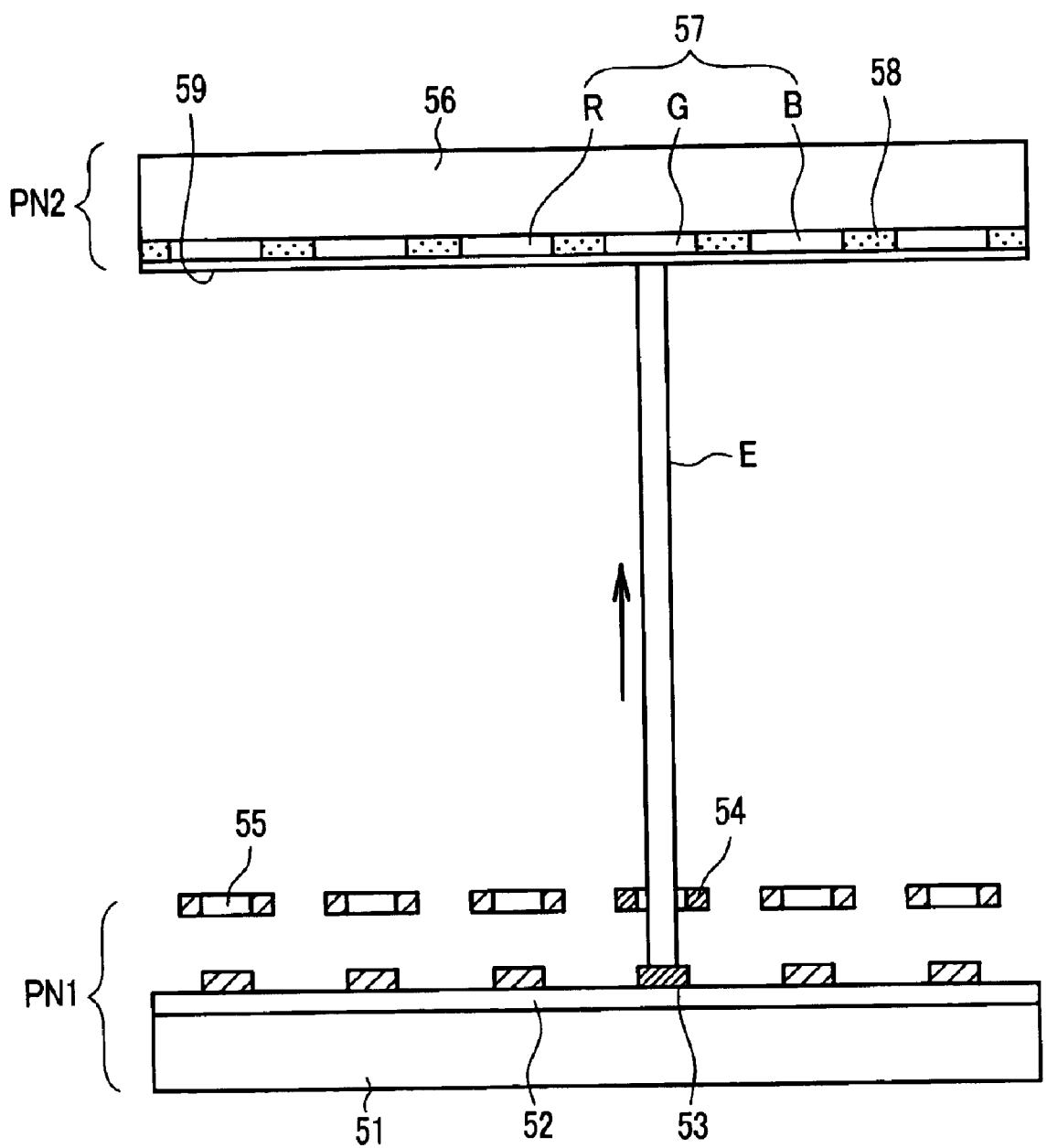
FIG. 8 is a schematic view for explaining an operation mechanism of a field emission type display device for explaining another example of the display device according to the present invention.
Figure 9:
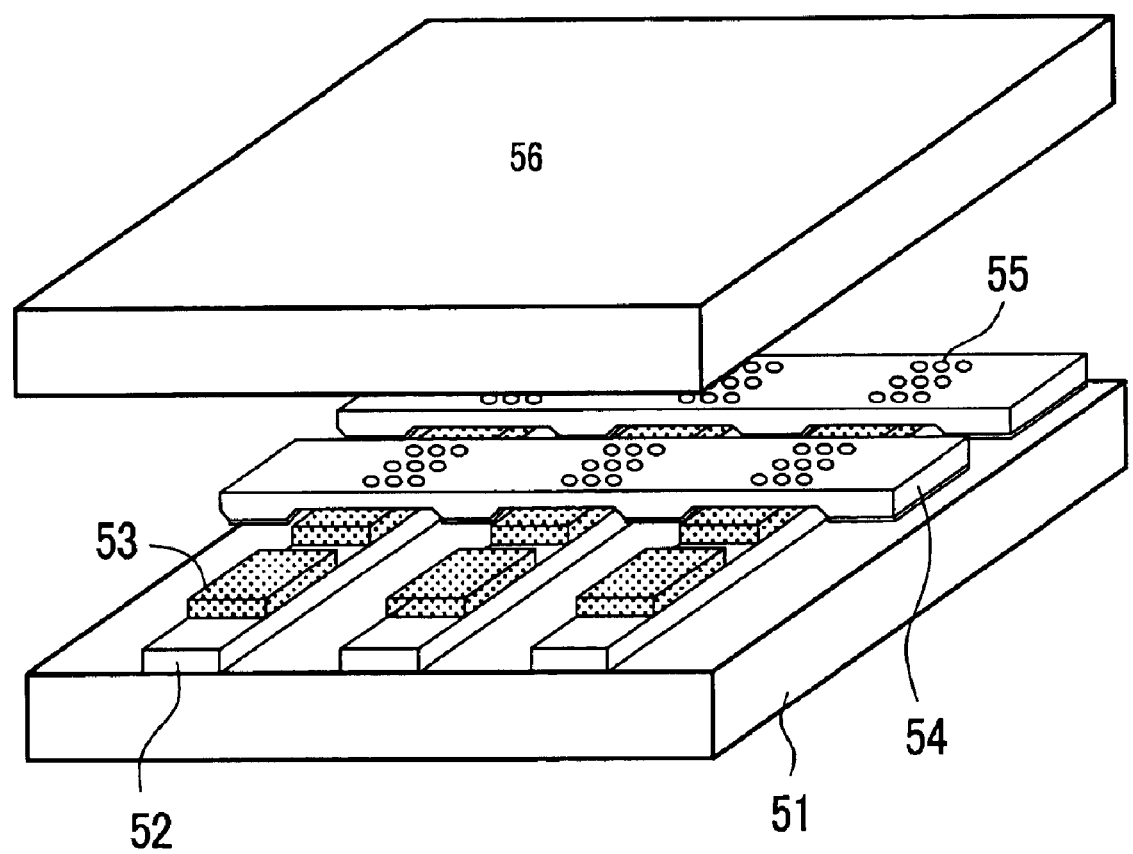
FIG. 9 is a perspective view of an essential part for explaining a constitutional example of the field emission type display device shown in FIG. 8.

FIG. 8 is a schematic view for explaining an operation mechanism of a field emission type display device for explaining another embodiment of the display device according to the present invention. Here, although the extending direction of cathode lines and phosphor films for respective colors are arranged in parallel, for the sake of explanation, in FIG. 8, an upper substrate is indicated such that the upper substrate is rotated by 90 degrees with respect to a lower substrate. Further, FIG. 9 is a perspective view of an essential part for explaining the constitution of a field emission type display device. In the drawing, reference symbol 51 indicates the lower substrate which is preferably made of glass, reference symbol 52 indicates the cathode lines, reference symbol 53 indicates cathodes, reference symbol 54 indicates grid electrodes, reference symbol 55 indicates electron passing apertures, reference symbol 56 indicates the upper substrate which is preferably made of glass, reference symbol 57 indicates the phosphor films of red (R), green (G), blue (B), reference symbol 58 indicates light shielding films (black matrix) which define respective phosphor films, and reference symbol 59 indicates anodes.

In FIG. 8 and FIG. 9, a large number of cathode lines 52 are arranged in parallel and the cathodes 53 are formed over the cathode lines 52 corresponding to respective pixels. A large number of grid electrodes 54 are provided such that the grid electrodes 54 are arranged close to the cathodes 53 and in parallel in the direction which crosses the cathode lines 52 in a state that the grid electrodes 54 are insulated from the cathodes 53. Further, over the upper substrate 56, the phosphors of red, green and blue which are defined by the light shielding films 58 are formed, and the anodes 59 are formed over the phosphors of red, green and blue. A space defined between both substrates is held in a vacuum state.

At crossing portions where a large number of cathode lines 52 and a large number of grid electrodes 54 cross each other, the pixels are formed, and a high voltage is applied between the cathode line 52 and the anode 59. Electrons E generated by the cathode 53 pass through the electron passing aperture 55 formed in the grid electrode 54 due to an electric field generated between the anode and the cathode 53 and impinge on the given phosphor film 57 and emit light of given color by exciting the phosphor film 57. Respective pixels are selected by the cathode lines 52 and the grid electrodes 54 and a two-dimensional image is reproduced on the upper substrate 56.

The present invention is not limited to the above-mentioned projection type cathode ray tube and the field emission type display device and is applicable to other types of cathode ray tubes and display devices in the same manner.

As has been described heretofore, according to the present invention, it is possible to provide various types of display devices which can further enhance the light emission characteristics of phosphors which are excited by the irradiation of electron beams of high density.

What is claimed is:

1. A display device comprising:

an electron source;

a phosphor layer which emits light when the phosphor layer is excited by electron beams from the electron source; and a panel on which the phosphor layer is formed, wherein phosphor which constitutes the phosphor layer is formed by adding at least one of ytterbium ion ($Yb^{3+}$) or samarium ion ($Sm^{3+}$) to a terbium ion ($Tb^{3+}$) activated phosphor which contains zinc (Zn), yttrium (Y), silicon (Si) and oxygen (O) as base materials.

2. A display device according to claim 1, wherein the addition concentration of the ytterbium ion ($Yb^{3+}$) is 10 $\mu$g or more and 1000 $\mu$g or less per 1 g of the phosphor.

3. A display device according to claim 1, wherein the addition concentration of the samarium ion ($Sm^{3+}$) is 30 $\mu$g or more and 300 $\mu$g or less per 1 g of the phosphor.

* * * * *